US011869089B1

(12) United States Patent
Black et al.

(10) Patent No.: US 11,869,089 B1
(45) Date of Patent: Jan. 9, 2024

(54) SYSTEM AND METHOD FOR BLUETOOTH BASED VEHICLE TELEMATICS DATA COLLECTION

(71) Applicant: STATE FARM MUTUAL AUTOMOBILE INSURANCE COMPANY, Bloomington, IL (US)

(72) Inventors: Zebediah Robert Black, Wylie, TX (US); Sivarama Krishna Panguluri, McKinney, TX (US); Krishna Nemmani, McKinney, TX (US); Maliha Haque, Richardson, TX (US); John Steven Kirtzic, Plano, TX (US); Sonia Torres, Richardson, TX (US); Teena Jagan, Richardson, TX (US); Fariha Islam, Richardson, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/459,257

(22) Filed: Jul. 1, 2019

(51) Int. Cl.
G06Q 40/08 (2012.01)
G07C 5/00 (2006.01)
G07C 5/06 (2006.01)
G07C 5/08 (2006.01)

(52) U.S. Cl.
CPC .......... G06Q 40/08 (2013.01); G07C 5/008 (2013.01); G07C 5/06 (2013.01); G07C 5/085 (2013.01)

(58) Field of Classification Search
CPC .......... G06Q 40/08; G07C 5/008; G07C 5/06; G07C 5/085

USPC ............................................................ 705/4
See application file for complete search history.

(56) References Cited

U.S. PATENT DOCUMENTS

| 9,311,271 | B2 | 4/2016 | Wright |
| 9,633,487 | B2 | 4/2017 | Wright |
| 10,176,524 | B1 * | 1/2019 | Brandmaier ......... G08G 1/0112 |
| 10,192,369 | B2 | 1/2019 | Wright |

(Continued)

FOREIGN PATENT DOCUMENTS

| CA | 2799714 A1 * | 11/2011 | ............. A61B 5/024 |
| WO | WO-2014143624 A1 * | 9/2014 | ............. G06F 17/00 |

OTHER PUBLICATIONS

Handel et al, "Insurance Telematics: Opportunities and Challenges with the Smartphone Solution", (2014) IEEE Intelligent Transportation Systems Magazine, Winter 2014, pp. 57-70. (Year: 2014).*

(Continued)

Primary Examiner — Ambreen A. Alladin
(74) Attorney, Agent, or Firm — Lee & Hayes, P.C.

(57) ABSTRACT

A computer-implemented method for analyzing a vehicle trip is presented. The method may include obtaining a wireless communication address of a vehicle of an insured driver. One or more processors may determine whether the wireless communication address corresponds to one of one or more known vehicles associated with an insured driver. Responsive to determining that the wireless communication address corresponds to one of the one or more known vehicles associated with the insured driver, the one or more processors may collect a plurality of vehicle telematics data during the vehicle trip. The one or more processors may also analyze the plurality of vehicle telematics data to determine at least one driving behavior of the insured driver.

20 Claims, 7 Drawing Sheets

(56) References Cited

U.S. PATENT DOCUMENTS

| | | |
|---|---|---|
| 10,198,879 B2 | 2/2019 | Wright |
| 2013/0289819 A1* | 10/2013 | Hassib .................. G07C 5/006 |
| | | 701/1 |
| 2015/0120336 A1* | 4/2015 | Grokop ................. G06Q 40/08 |
| | | 705/4 |
| 2017/0041737 A1* | 2/2017 | Fischer ................ H04W 4/027 |
| 2017/0069144 A1* | 3/2017 | Lawrie-Fussey .... G06Q 10/083 |
| 2017/0132712 A1* | 5/2017 | Bowne ................. B60W 40/09 |
| 2019/0311404 A1* | 10/2019 | Wasserman ........ G06Q 30/0265 |

OTHER PUBLICATIONS

Conradi et al, "A secure vehicle-based telematics environment used for enhanced smartphone communication", (Feb. 2016) VDE Verlag GmbH, Berlin, pp. 105-110. ISBN 978-3-8007-4167-0. (Year: 2016).*

Wahlstrom et al, "Smartphone-Based Vehicle Telematics: a Ten Year Anniversary" (Oct. 2017) IEEE Transactions on Intelligent Transportation Systems, vol. 18, No. 10, pp. 2802-2825 (Year: 2017).*

* cited by examiner

SYSTEM AND METHOD FOR BLUETOOTH BASED VEHICLE TELEMATICS DATA COLLECTION

FIELD OF THE DISCLOSURE

The present disclosure generally relates to collecting vehicle telematics data for vehicle trip analysis and, more particularly, to a system and method for Bluetooth based vehicle telematics data collection.

BACKGROUND

In the area of auto insurance, data about an insured person or vehicle is of the utmost importance. Thanks to advances in technology, specifically in the field of Telematics, high-resolution data may be gathered on a specific driving trip and aggregated over a period of time. This aggregation may result in discounts on the policy holder's monthly rate and help encourage safer driving habits. However, the manner in which the data is gathered can vary, with some methods being less favorable to the customer than others.

Conventional techniques to collect telematics data involve the use of multiple devices and are tedious for a driver. For example, many conventional techniques utilize a separate, third-party device in addition to a driver's mobile device. However, these conventional techniques provide a cumbersome experience for the driver because the separate, third-party device may, for example, fail to identify the driver's vehicle and/or fail to transfer and collect telematics data for a vehicle it was not hard-coded to identify. Proper identification and collection of data for the driver's vehicle is paramount because any benefits or discounts a driver would otherwise receive for safe driving habits will be lost if the insurer cannot verify the vehicle used or the data associated with a particular vehicle trip.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for analyzing a vehicle trip may be provided. The method may include obtaining, by one or more processors, a wireless communication address of a vehicle; determining, by the one or more processors, whether the wireless communication address corresponds to one of one or more known vehicles associated with an insured driver; responsive to determining that the wireless communication address corresponds to one of the one or more known vehicles associated with the insured driver, collecting, by the one or more processors, a plurality of vehicle telematics data during the vehicle trip; and/or analyzing, by the one or more processors, the plurality of vehicle telematics data to determine at least one driving behavior of the insured driver.

In another embodiment, a computer device for analyzing a vehicle trip may be provided. The computer device may include one or more processors and one or more memories coupled to the one or more processors. The one or more memories may include non-transitory computer executable instructions stored therein. The non-transitory computer executable instructions, when executed by the one or more processors, may cause the one or more processors to obtain a wireless communication address of a vehicle of an insured driver; determine whether the wireless communication address corresponds to one of one or more known vehicles associated with an insured driver; responsive to determining that the wireless communication address corresponds to one of the one or more known vehicles associated with the insured driver, collect a plurality of vehicle telematics data during the vehicle trip; and/or analyze the plurality of vehicle telematics data to determine at least one driving behavior of the insured driver.

In yet another embodiment, a computer readable storage medium may be provided that includes non-transitory computer readable instructions stored thereon for analyzing a vehicle trip. The instructions, when executed on one or more processors, may cause the one or more processors to obtain a wireless communication address of a vehicle of an insured driver; determine whether the wireless communication address corresponds to one of one or more known vehicles associated with an insured driver; responsive to determining that the wireless communication address corresponds to one of the one or more known vehicles associated with the insured driver, collect a plurality of vehicle telematics data during the vehicle trip; and/or analyze the plurality of vehicle telematics data to determine at least one driving behavior of the insured driver.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

I. EXAMPLE SYSTEM AND RELATED FUNCTIONALITY FOR ANALYZING A VEHICLE TRIP

Figure 1:
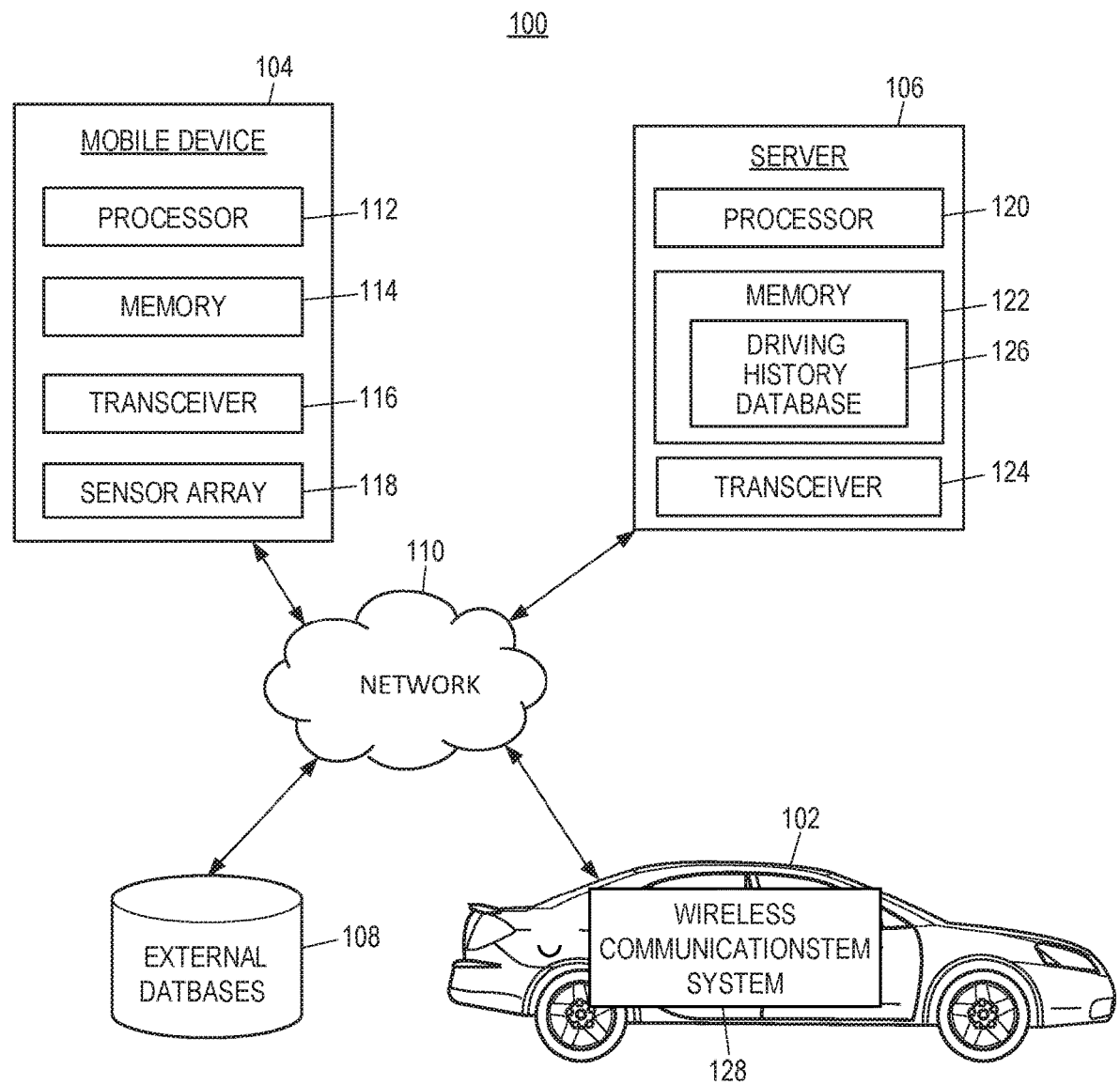
FIG. 1 illustrates an example system for analyzing a vehicle trip.

FIG. 1 illustrates an example system 100 for analyzing a vehicle trip. The example system 100 may include a vehicle 102, a mobile device 104, a server 106, external databases 108, and a network 110. While illustrated in FIG. 1 as a single external database, in some embodiments the external databases 108 includes two or more external databases. The vehicle 102 may include a wireless communication system 128 such that a wireless communication device (e.g., mobile device 104) may be able to obtain a wireless communication address (e.g., a media access control (MAC) address) associated with the vehicle 102. Moreover, the network 110 may be a computer network of an insurance provider (e.g., provided or used by the insurance provider or communications over which the insurance provider otherwise controls or facilitates).

The mobile device 104 may include a processor 112, a memory 114, a transceiver 116, and a sensor array 118. While referred to herein as a "processor," in some embodiments the processor 112 includes two or more processors. The memory 114 may store computer-executable instructions, which may be executed by the processor 112. The sensor array 118 may include, for example, an accelerometer, a gyroscope, a magnetometer, a global positioning system (GPS), a barometer, a proximity sensor, and an ambient light sensor. However, it should be understood that the sensor array 118 is not limited to the sensors disclosed herein. The mobile device 104 may be configured to receive communications from the server 106 or the vehicle 102 before, during, or after an analysis of the vehicle trip has taken place.

In various embodiments, the mobile device 104 may execute computer-executable instructions, such as a mobile application, that allow the actions described herein to be implemented. For example, if the mobile device 104 is a smartphone, the user may capture data with the sensor array 118 to transmit through the network 110 to the server 106 for processing. The mobile device 104, and each of the computing devices referred to herein, may be any suitable computing device such as, but not limited to, a desktop computer, a laptop computer, a mobile phone such as a smart phone, a tablet, a phablet, smart glasses, other wearable computing device(s), etc.

The server 106 may include a processor 120, a memory 122, and a transceiver 124. While referred to herein as a "processor," in some embodiments the processor 120 includes two or more processors. The memory 122 may store computer-executable instructions, which may be executed by the processor 120. The memory 122 may include a driving history database 126. The driving history database 126 may contain historical data relating to a user's operation of the vehicle 102.

For example, and as further described herein, an insurance provider may want to compile a history of driving data for a particular insured user of the vehicle 102, so the provider may make informed decisions concerning the insured user's policy (e.g., lower an insured user's insurance premium based on a history of good driving habits). The insurance provider may store this history of driving data in the driving history database 126, and access the data periodically to update the insured user's policy accordingly. Moreover, the insured user's policy may refer to an insurance policy covering, for example, the user's vehicle or the user.

In embodiments where, as noted above and as further discussed below, at least one driving behavior and/or a driving history is provided to an insurance provider, the insurance provider may receive this indication at the server 106. The server 106, in some embodiments, may also make available for download (e.g., via the network 110) the application executed by the mobile device 104 to implement functionality described herein. It will be appreciated that server 106 may be a server provided by or used by the insurance provider, or use of which the insurance provider otherwise controls or facilitates.

In various embodiments, processors of the mobile device 104 and other devices, such as the server 106, may execute instructions to transmit data to, receive data from, or otherwise communicate with devices of the example system 100 via the network 110 as further described below. The network 110 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 110 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example system 100 allows analyzing a vehicle trip, and allows, among other advantages, identification of a vehicle of an insured driver without the need for third-party devices or consistently-maintained communication links to the vehicle, and determination of at least one driving behavior for the user based on particular information obtained from monitoring the telematics data of the vehicle during the vehicle trip.

II. EXAMPLE OPERATIONAL EMBODIMENTS OF THE SYSTEM

Figure 2:
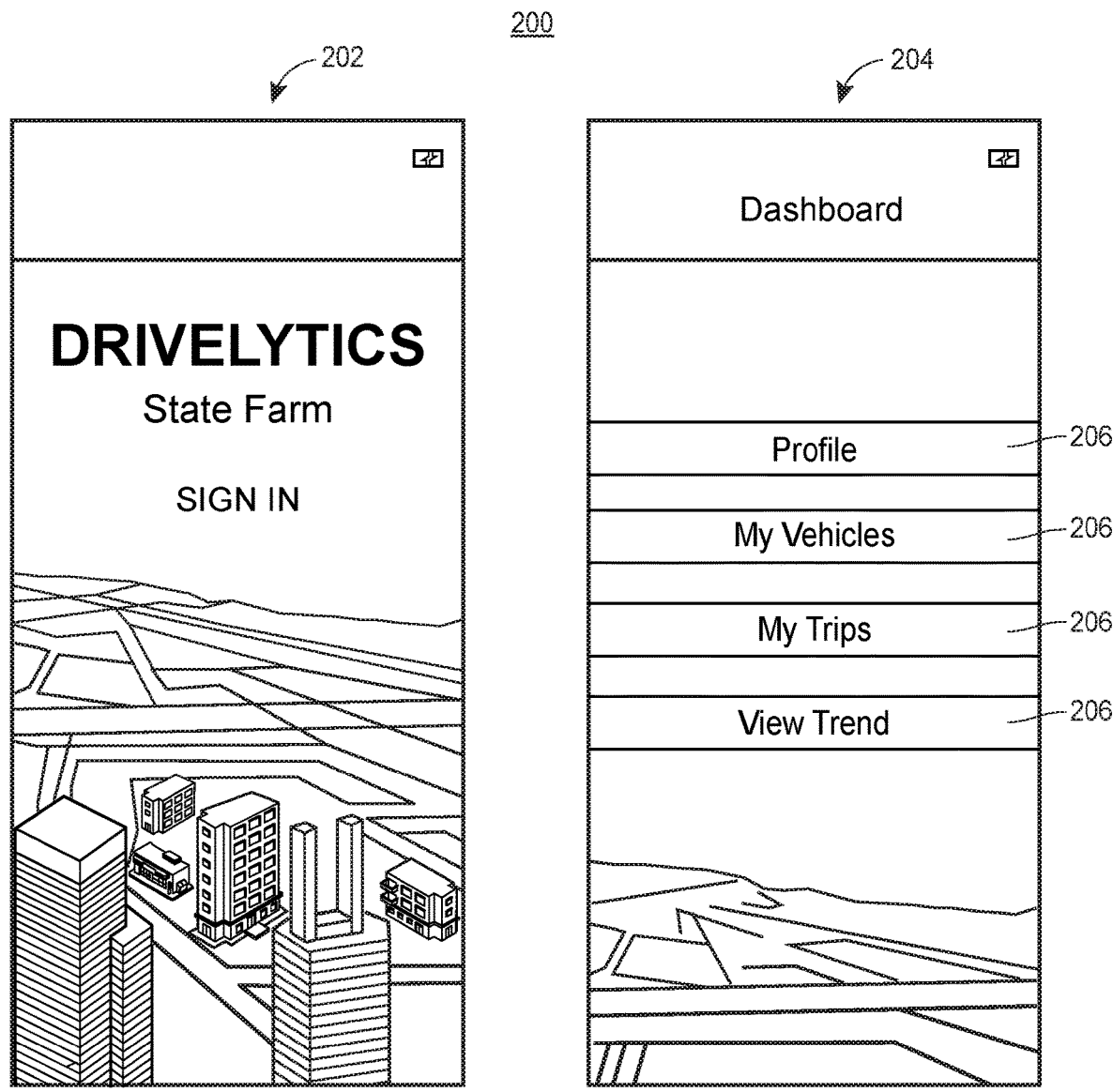
FIG. 2 illustrates a first set of GUIs comprising first and second example GUIs for an operational embodiment of, for example, the system 100 of FIG. 1.

FIG. 2 illustrates a first set of GUIs 200 comprising first 202 and second 204 example GUIs for an operational embodiment of, for example, the system 100 of FIG. 1. The first set of GUIs 200 may be generated by, for example, an application stored in memory (e.g., memory 114) of a device (e.g., mobile device 104), and executed on the device by a processor (e.g., processor 112). The first example GUI 202 illustrates an example introductory screen of an application a user might see when, for example, the user intends to view past vehicle trips, or record and/or analyze a vehicle trip. As shown in the first example GUI 202, the application may prompt a user to sign in by entering the user's associated credentials prior to viewing past vehicle trips, and recording and/or analyzing a prospective vehicle trip.

The second example GUI 204 may include a plurality of user options 206. The plurality of user options 206 may include an option for the user to view their profile. The device 104 may contain the user's pre-established profile and corresponding user credentials, or the device 104 may prompt the user to establish a profile upon an initial login. Moreover, the device 104 may include information in a user's profile associated with, for example, an insurance policy corresponding to the user, a vehicle associated with the user, a residence associated with the user, or other modes of transportation or insurable items associated with the user or other identified persons. For example, the user's associated credentials, and hence the user's profile as established through the application, may include information related to a family member (i.e., spouse, parent, children, siblings, etc.) or other person identified on the user's insurance policy.

The device 104 may also allow a user, through the plurality of user options 206, to view the vehicles associated with the user's profile, view past vehicle trips the user has taken and recorded, and/or view trends associated with the user's operation of the vehicle (e.g., vehicle 102). Additionally or alternatively, the device 104 may allow a user, through the plurality of user options 206, to view vehicles, past trips, and/or trends associated with operation of the vehicle by other identified persons on the user's insurance policy.

For example, and as discussed further herein, the device 104 may include one or more processors 112 configured to identify a first movement of a vehicle (e.g., vehicle 102), indicating the beginning of a vehicle trip. In this example, after the device 104 identifies the first movement, the device 104 may activate the application. The application may then, in turn, display the first set of GUIs 200 shown in FIG. 2 (i.e., first example GUI 202 and second example GUI 204). Hence, the device 104 may activate the application to display the first set of GUIs 200 as an indication of the beginning of a vehicle trip. In other words, once the device 104 detects the beginning of a vehicle trip, the device 104 may assume the user wants to, for example, record the details of their trip or dynamically monitor the status of their vehicle trip, and activates the application to allow the user to perform those functions.

Alternatively, the device 104 may prompt the application to display the first set of GUIs 200 as an indication of the end of a vehicle trip. For example, the one or more processors 112 of the device 104 may be configured to identify a second movement of the vehicle 102, indicating the end of a vehicle trip. The device 104 may then signal the application to activate, resulting in the application displaying the first set of GUIs 200. In other words, once a user has completed a vehicle trip, the device 104 may assume it is safe for the user to interact with the device 104, and that the user wants to view their profile and/or review their recent trip. Hence, the device 104 activates the application to allow the user to perform those functionalities.

Figure 3:
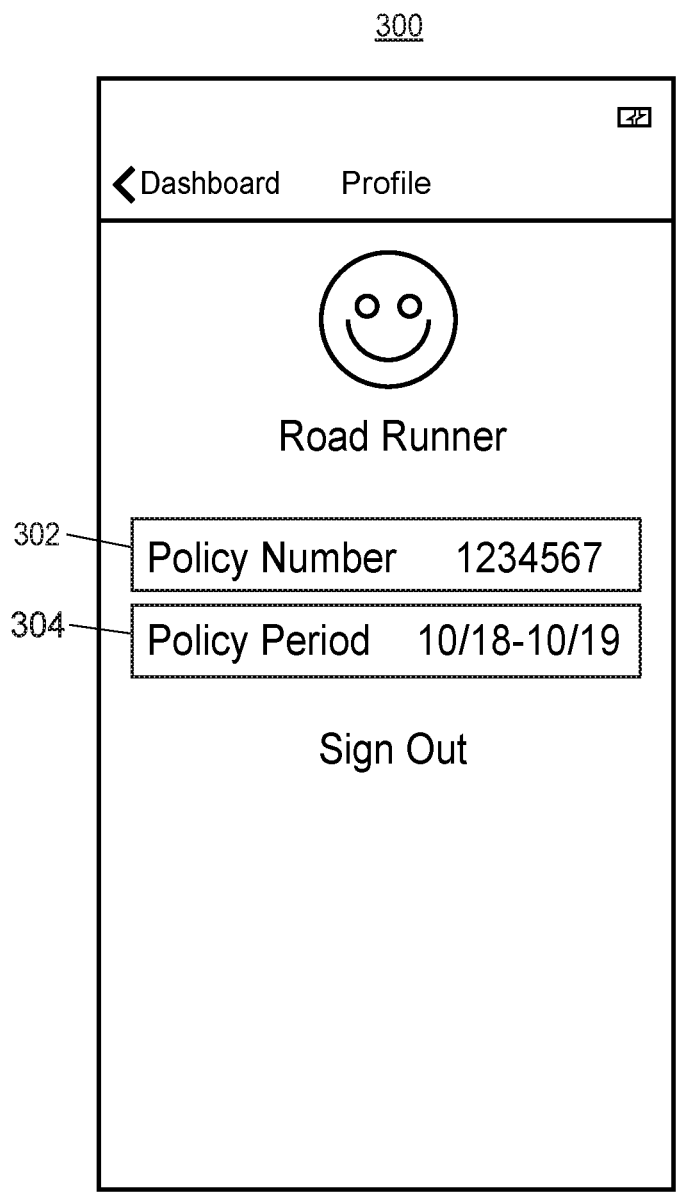
FIG. 3 depicts a third example GUI for an operational embodiment of, for example, the system of FIG. 1.

FIG. 3 depicts a third example GUI 300 for an operational embodiment of, for example, the system of FIG. 1. The third example GUI 300 includes a first information area 302 and a second information area 304. The third example GUI 300 may be generated by, for example, an application stored in memory (e.g., memory 114) of a device (e.g., mobile device 104), and executed on the device by a processor (e.g., processor 112). The third example GUI 300 may illustrate, for example, a profile screen a user may see after they have logged into the application through the first and second example GUIs 200.

The device 104 may include relevant information related to a user's profile in both the first information area 302 and the second information area 304. Moreover, the relevant information may be associated with the user's insurance policy. For example, and as illustrated in FIG. 3, the first information area 302 includes a policy number indicative of the user's insurance policy identifier. Further in this example, the second information area 304 includes an indication of the active period for a user's insurance policy.

However, it should be understood that the device 104 may include any amount of relevant information, and may display any number of profiles in the third example GUI 300. For example, the device 104 may include multiple policy numbers to reflect the user having a plurality of insurance policies associated with their account in the first information area 302. The device 104 may include multiple indications of the active period corresponding to each of the user's insurance policies in the second information area 304.

Moreover, the device 104 may include policy numbers, active period indications, associated vehicles, and other relevant information related to a plurality of users in the third example GUI 300. As discussed further herein, the device 104 may display indications of policy and/or profile information associated with family members, or other related individuals to the user in the third example GUI 300. To illustrate, where multiple users are listed on an insurance policy as potential operators of a particular insured vehicle, the device 104 may list each user profile associated with the insurance policy in the third example GUI 300 when a particular user accesses their profile. Hence, if a family drives a particular vehicle (e.g., vehicle 102), then the device 104 may list each member of the family in the third example GUI 300 who is known to operate the vehicle 102.

Figure 4:
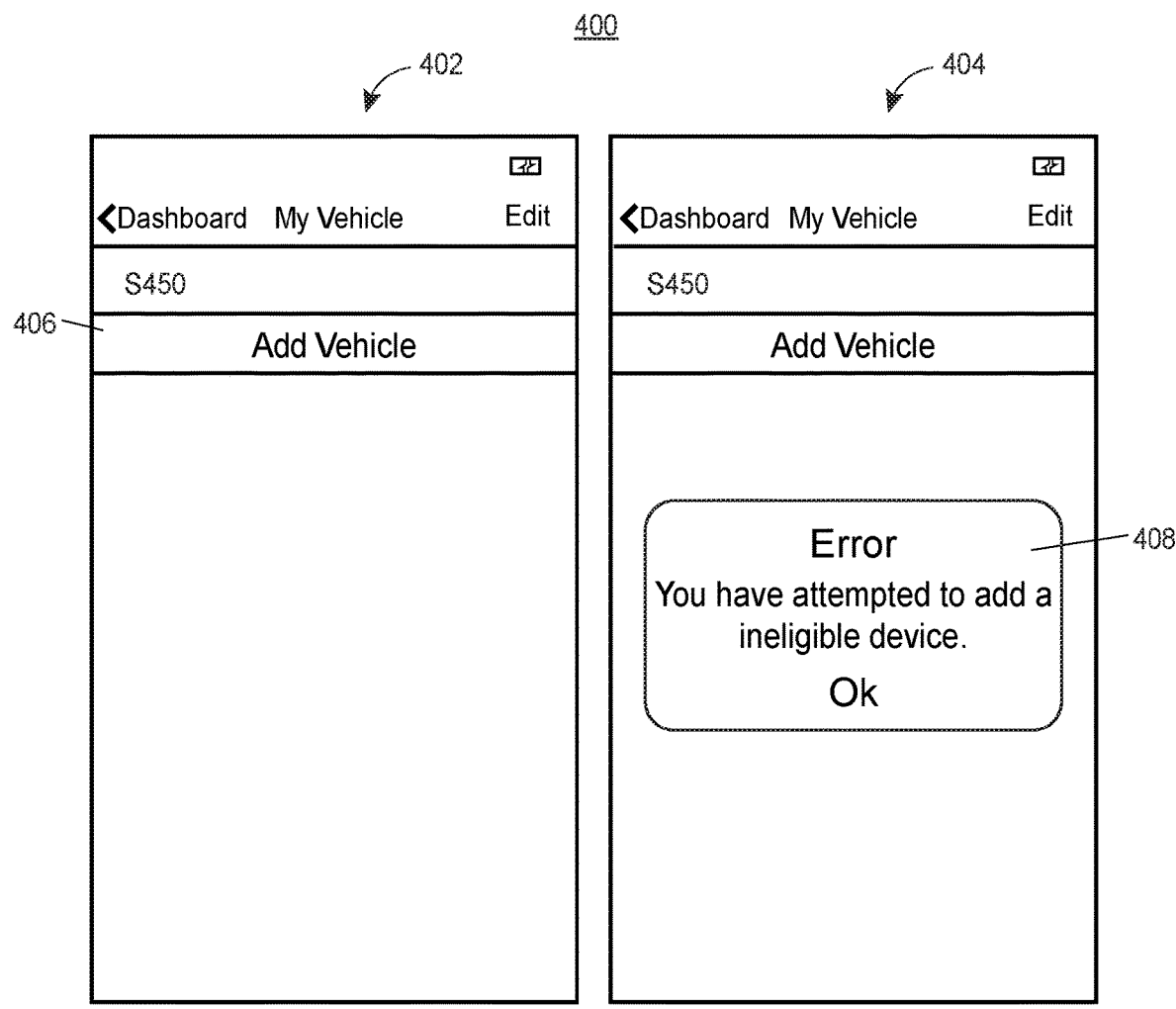
FIG. 4 depicts a second set of GUIs comprising fourth and fifth example GUIs for an operational embodiment of, for example, the system of FIG. 1.

FIG. 4 depicts a second set of GUIs 400 comprising fourth 402 and fifth 404 example GUIs for an operational embodiment of, for example, the system of FIG. 1. The fourth example GUI 402 includes a user interactive area 406, and the fifth example GUI 404 includes a user notification area 408. The second set of GUIs 400 may be generated by, for example, an application stored in memory (e.g., memory 114) of a device (e.g., mobile device 104), and executed on the device by a processor (e.g., processor 112). The second set of GUIs 400 may represent, for example, a set of GUIs the device 104 may display to a user through an application for the user to analyze and/or modify the vehicles associated with their user profile. In this example, the user profile may be associated with an insurance policy corresponding to the user.

For example, a user may interact with the user interactive area 406. The application, as executed on the device 104, may then prompt the user to enter information related to a vehicle (e.g., vehicle 102). However, if the vehicle 102 does not have, for example, Bluetooth connectivity capabilities, the application may return an error to the user, as illustrated by the user notification area 408. The vehicle 102 may be associated with a user's insurance policy.

In certain embodiments, the user may need to enter a vehicle into the application under the user's profile before they are able to utilize the steps of the method further described herein. In other words, when a device (e.g., mobile device 104) obtains a communication address of a vehicle in order to identify the vehicle, if the vehicle is not associated with a user's profile, the device 104 may not activate the application to track and/or record a user's vehicle trip.

However, in other embodiments, the device 104 may prompt the user to verify that a particular vehicle, as identified by the device 104, is associated with a user. Once the device 104 obtains a communication address of a vehicle the user has entered, the device 104 may identify the vehicle as one unassociated with the user's profile and/or insurance policy. The device 104 may then, through the application, prompt the user to identify the vehicle (i.e., specify make, model, etc.). After the device 104 obtains the identifying information from the user, the application may then display the vehicle as one associated with the user's profile, and thus allow the user to perform functions related to the application with respect to the newly added vehicle.

Figure 5:
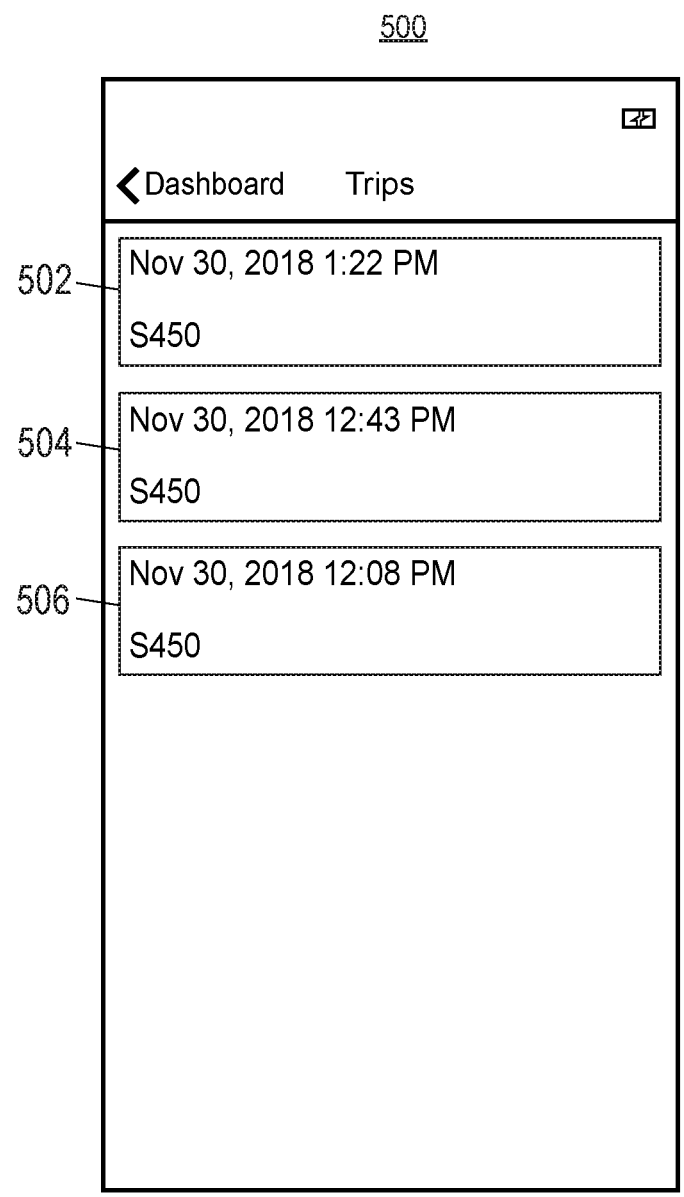
FIG. 5 depicts a sixth example GUI for an operational embodiment of, for example, the system of FIG. 1.

FIG. 5 depicts a sixth example GUI 500 for an operational embodiment of, for example, the system of FIG. 1. The sixth example GUI 500 includes a first trip record 502, a second trip record 504, and a third trip record 506. The sixth example GUI 500 may be generated by, for example, an application stored in memory (e.g., memory 114) of a device (e.g., mobile device 104), and executed on the device by a processor (e.g., processor 112). The sixth example GUI 500 may represent, for example, a record of all trips recorded by the device 104.

For example, a user may prompt the device 104, through the application, to record a vehicle trip. The device 104 may then record the trip and display the results of the recording. The first trip record 502 typifies an example result of a vehicle trip recording. Accordingly, and as illustrated in the first trip record 502, an example vehicle trip record may include information regarding the vehicle trip such as a date the trip was taken, a time the trip was taken, and the identifier of the vehicle used during the trip. However, it should be understood that any relevant information may be included in a vehicle trip record (e.g., location, weather, average speed, notable braking events, notable acceleration events, notable cornering events, phone distraction events, distance traveled, elevation changes, average elevation, total trip duration, etc.).

Moreover, in certain embodiments, the device 104 may include different amounts and/or types of information about each respective trip in their respective trip records. For example, the device 104 may include different relevant information in the first trip record 502, second trip record 504, and the third trip record 506 concerning their respective trips. Specifically, the device 104 may include the date and time of the first trip in the first trip record 502, but may only include the date of the second trip in the second trip record 504.

The device 104 may enable a user to navigate between GUI screens of the application by clicking or otherwise interacting with the trip records. For example, a user may press, click, or otherwise select an area of the device 104 associated with the first trip record 502. The device 104 may then navigate to additional screens of the application where the user may be presented with additional information regarding the first trip. To illustrate, if the first trip record 502 provided a user with the date and time of the first vehicle trip, the device 104 may display the location and total travel time of the first vehicle trip on the additional screens accessed after the user interacts with the area of the device 104 associated with the first trip record 502.

Figure 6:
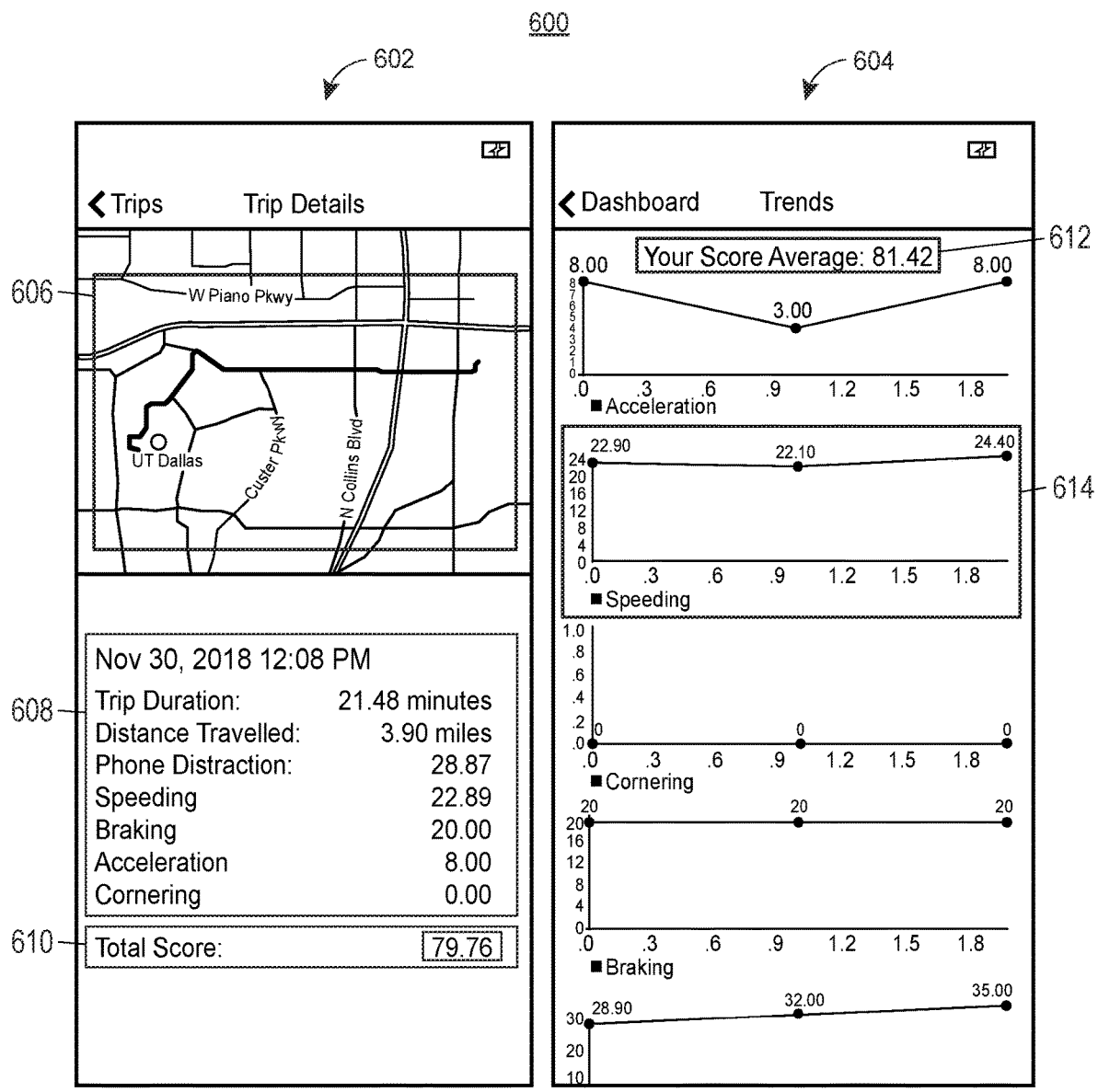
FIG. 6 depicts a third set of GUIs comprising seventh and eighth example GUIs for an operational embodiment of, for example, the system of FIG. 1.

FIG. 6 depicts a third set of GUIs 600 comprising seventh 602 and eighth 604 example GUIs for an operational embodiment of, for example, the system of FIG. 1. The seventh example GUI 602 includes a trip map 606, a trip metric breakdown 608, and a trip total score 610. The seventh example GUI 602 may be generated by, for example, an application stored in memory (e.g., memory 114) of a device (e.g., mobile device 104), and executed on the device by a processor (e.g., processor 112). The seventh example GUI 602 may represent, for example, an analysis of a vehicle trip taken by a user after the user has completed the vehicle trip.

The device 104 may generate, through the application, the seventh example GUI 602 in response to a prompt from a user, or may automatically generate the seventh example GUI 602 in response to detecting and identifying the end of a vehicle trip, as discussed further herein. Moreover, the seventh example GUI 602 may represent an additional screen presented by the application to a user in response to the user interacting with the device 104 (e.g., a user pressing, clicking, or otherwise selecting an area of the device 104 associated with the first trip record 502).

The trip map 606 may represent the route recorded by the device 104. For example, upon detecting and identifying the beginning of a vehicle trip, as discussed further herein, the device 104 may begin recording information associated with the vehicle trip. One such piece of information may be the location and route of the vehicle trip. Indeed, the device 104 may track and record the location of the vehicle (e.g., vehicle 102) as the user progresses through the vehicle trip. The device 104 may also display the location and routing information associated with a particular vehicle trip in real-time, as the trip progresses. Moreover, the device 104 may enable the trip map 606 to be interactive such that a user can, for example, zoom in or out on particular portions of the trip map 606, mark locations on the trip map 606, set destinations or alter starting locations on the trip map 606, highlight certain portions of the vehicle trip route for individualized analysis on the trip map 606, or any other interactive functionality.

In certain embodiments, the device 104 includes information related to multiple vehicle trips in the trip map 606. For example, the user may desire to analyze their five most recent vehicle trips. After the user selects that functionality within the application, the device 104 may then display the recorded route information associated with each of the five most recent vehicle trips in the trip map 606. Alternatively, the user may select that the device 104 displays the five most recent vehicle trips, or any other suitable amount of recorded vehicle trips, in the trip map 606 after every vehicle trip, before each vehicle trip, or at any other time.

The trip metric breakdown 608 may include various metrics tracked and recorded by the device 104, and associated with a vehicle trip. For example and as illustrated, in part, in the trip metric breakdown 608, the device 104 may record metrics such as: speed, acceleration, braking, cornering, phone usage, trip duration, distance travelled, date, beginning time of vehicle trip, ending time of vehicle trip, location, weather, elevation changes, average elevation, or any other suitable metric. Similar to the trip map 606, the device 104 may display the metric information associated with a particular vehicle trip in the trip metric breakdown 608 in real-time, as the trip progresses. Moreover, the device 104 may enable the trip metric breakdown 608 to be interactive such that a user can, for example, highlight a particular metric for further analysis, scroll through the trip metric breakdown 608 to view additional metrics not currently displayed on the screen of the device 104, or any other suitable interactive functionality.

For example, the user may desire to view a particular metric associated with their vehicle trip that is not currently displayed on the device's 104 screen. Accordingly, the device 104 may enable interactive functionality of the trip metric breakdown 608 such that the user may press, click, or otherwise select the trip metric breakdown 608 and scroll through the various metrics recorded by the device 104. Additionally or alternatively, the device 104 may enable a user to select which metrics are displayed in the trip metric breakdown 608.

In certain embodiments, the device 104 may present the information contained in the trip metric breakdown 608 in the trip map 606. Specifically, the device 104 may color-code, highlight, pattern, or otherwise indicate on the trip map 606 events associated with each, some, or one of the metrics included in the trip metric breakdown 608. For example, the device 104 may indicate a notable braking event by highlighting a portion of the route displayed in the trip map 606 where the notable braking event occurred. In another example, the device 104 may color-code the entire route displayed in the trip map 606 to correspond to the speed associated with the vehicle 102 at the indicated regions of the route.

The trip total score 610 may include an indication, determined by the device 104, of a user's quality of driving over the course of a vehicle trip. The device 104 may determine the indication of the user's quality of driving by, for example, analyzing each of the quality metrics indicated in the trip metric breakdown 608 to perform a calculation resulting in the user's quality of driving. The device 104 may perform this calculation by, for example, summing each of the quality metrics, taking a weighted average of each quality metric, or any other suitable calculation process. Moreover, the device 104 may include all, some, or one of the quality metrics when calculating the trip total score 610. It should be understood that the trip total score 610 may be an alphanumeric character, symbol, or any other suitable indication.

Additionally, the device 104 may enable interactive functionality of the trip total score 610 such that the user may press, click, or otherwise select the trip total score 610 to perform additional functions. For example, the user may select the trip total score 610, and the device 104 may display the information used to calculate the trip total score 610. In another example, the user may select the trip total score 610, and the device 104 may indicate portions of the trip map 606 that most impacted the user's trip total score 610. To illustrate, if the user's vehicle trip included a notable acceleration event that significantly impacted the trip total score 610 for the vehicle trip, when the user selects the trip total score 610, the device 104 may indicate the region of the trip map 606 where the notable acceleration event occurred, and provide the corresponding acceleration information from the trip metric breakdown 608.

The eighth example GUI 604 includes a trip average score 612 and a trip metric display 614. The eighth example GUI 604 may be generated by, for example, an application stored in memory (e.g., memory 114) of a device (e.g., mobile device 104), and executed on the device by a processor (e.g., processor 112). The eighth example GUI 604 may represent, for example, an display of trends associated with the user over the course of multiple vehicle trips.

The trip average score 612 may represent, for example, an aggregate driving rating for the user, as calculated by the device 104. The device 104 may calculate the trip average score 612 by averaging each trip total score 610. As an example, the device 104 may continuously and in real-time, update the trip average score 612 by including a trip total score 610 from a recently completed vehicle trip in the trip average score 612 calculation and recalculating the trip average score 612. It should be understood that the trip average score 612 may be an alphanumeric character, symbol, or any other suitable indication.

The trip metric display 614 may represent, for example, a record of values corresponding to various metrics from multiple vehicle trips by a user. In other words, if a user wishes to view the historic development of their driving habits through multiple vehicle trips, the device 104 may display the previous several values of a particular metric in the trip metric display 614 for the user to evaluate their performance over time.

As an example, and as illustrated in the trip metric display 614, the device 104 may record and display speeding values for multiple vehicle trips in a trend-line fashion. Thus, if the user wishes to determine if their performance in regards to speeding is improving or changing, the device 104 allows the user to visually evaluate their performance in regards to speeding as it has developed over their past several vehicle trips.

It should be understood that the device 104 may enable any quantity of metrics, as included in the trip metric breakdown 608 for example, to occupy a single trend-line region. The device 104 may also enable a user to selectively include any number of past vehicle trip data when analyzing their historic performance with respect to any particular metric.

Moreover, the device 104 may enable interactive functionality of the trip metric display 614 such that the user may press, click, or otherwise select the trip metric display 614 to perform additional functions. For example, the user may select the trip metric display 614, and the device 104 may display the information used to generate the trip metric display 614. Specifically, a user may select a particular point on the trip metric display 614. The device 104 may then retrieve the trip information associated with that particular point (i.e., the information provided in the seventh example GUI 602 such as the trip map 606, trip metric breakdown 608, and trip total score 610). Further, the device 104 may perform any of the functionality described herein with respect to the seventh example GUI 602 when a user selects a particular point on the trip metric display 614.

Similarly, the device 104 may enable a user to select multiple points on the trip metric display 614. Once selected, the device 104 may present the trip information associated with both points independently, or compare the information of the two trips. To illustrate, if a user selects two points on the trip metric display 614, the device 104 may then retrieve trip information associated with both points. The device 104 may display the information associated with both points in a comparative fashion by, for example, highlighting, color-coding, patterning, or otherwise indicating the differences and/or similarities between the two vehicle trips in the trip maps 606. The device 104 may also indicate the differences between all, some, or one of the metrics included in the trip metric breakdowns 608 for each vehicle trip.

III. EXAMPLE OF A METHOD FOR ANALYZING A VEHICLE TRIP

Figure 7:
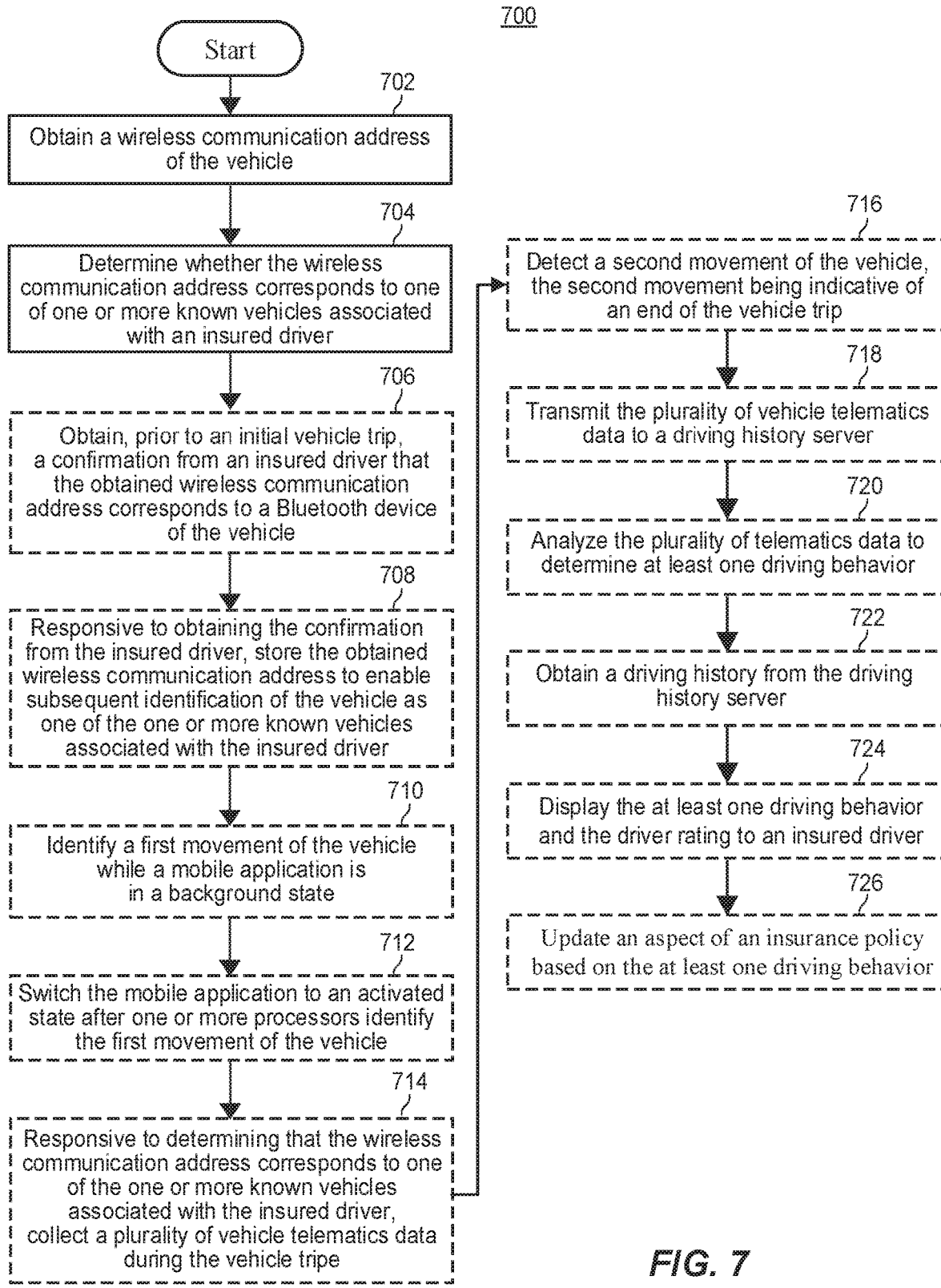
FIG. 7 is a flowchart depicting an example method corresponding to various embodiments of the present disclosure.

FIG. 7 is a flowchart depicting an example method 700 corresponding to various embodiments of the present disclosure. The method 700 begins at block 702 where one or more processors (e.g., processor 112 and/or processor 120) of a device (e.g., mobile device 104) obtains a wireless communication address of a vehicle (e.g., vehicle 102). In certain embodiments, the wireless communication address is a media access control (MAC) address corresponding to a Bluetooth device of the vehicle 102. Acquiring the MAC address is advantageous because the address is unique to the vehicle 102, and thus allows the device 104 to easily identify the vehicle 102. It should be understood that the vehicle 102 may communicate through any suitable communication protocol (e.g., Bluetooth, ZigBee, WiFi, etc.). Block 702 may be performed by, for example, any or all of the one or more processors 112 of the device 104, any or all of the one or more processors 120 of the server 106, or any combination of both.

Moreover, the one or more processors 112 may obtain the wireless communication address of the vehicle without establishing a communication link with the vehicle 102. For example, a device 104 may detect a signal from a wireless communication system (e.g., wireless communication system 128) embedded or otherwise associated with the vehicle 102 upon entering a threshold communication range with the wireless communication system 128. After detection, the device 104 may obtain the wireless communication address of the vehicle 102 from the wireless communication system 128 to perform further steps of the method described herein. However, in this example, the device 104 may simply obtain the address and never establish a communication link with the wireless communication system 128. This allows the device 104 to minimize its processing demand (i.e., increase efficiency by not establishing and/or maintaining a communication link with the vehicle 102) while effectively performing steps discussed further herein.

In other embodiments, the device 104 may obtain the wireless communication address once the device 104 is placed inside the vehicle 102. The application on the device 104 may also obtain the wireless communication address of the vehicle 102 after the application is switched to an active state by the device 104.

At block 704, the device 104 may determine whether the wireless communication address corresponds to one of one or more known vehicles associated with an insured driver. For example, the device 104 may access information stored in its memory 114 or a remote database (e.g., memory 122, external databases 108) to identify each of the one or more vehicles associated with an insured driver. Each of the one or more vehicles may be identified via the application discussed herein and the insured driver's user profile. In other words, the insured driver may have one or more vehicles previously identified and stored in the application under their user profile that the device 104 may use to authenticate any obtained wireless communication addresses. The device 104 may then compare the obtained wireless communication address with the listings of one or more known vehicles associated with the insured driver to check if any of the stored wireless communication addresses match the obtained wireless communication address. Block 704 may be performed by, for example, any or all of the one or more processors 112 of the device 104, any or all of the one or more processors 120 of the server 106, or any combination of both.

Additionally or alternatively, the device 104 may compare the obtained wireless communication address to the addresses of one or more vehicles listed on an insurance policy. The device 104 may, for example, compare the information contained in an insurance policy associated with a user of the device 104 to the obtained wireless communication address. If the insurance policy does not describe or contain information describing a vehicle similar to that described by the obtained wireless communication address, the device 104 may not perform some or any further steps of the current method 700 with respect to the vehicle described by the obtained wireless communication address. Additionally or alternatively, if the insurance policy does not describe or contain information describing a similar vehicle to that described by the obtained wireless communication address, the device 104 may prompt a user to modify or adjust the insurance policy to include the vehicle represented by the obtained wireless communication address. On the other hand, if the obtained wireless communication address describes a vehicle identified in the insurance policy, the device 104 may perform some or all of the remaining steps of the method 700.

At optional block 706, the device 104 may obtain, prior to an initial vehicle trip, a confirmation from an insured driver that the obtained wireless communication address corresponds to a Bluetooth device (e.g., wireless communication system 128) of the vehicle 102. For example, an insured driver may purchase a new vehicle (e.g., vehicle 102) and intend to integrate the vehicle's 102 identification data into the application, as described herein in reference to FIG. 4. The vehicle identification data may contain, for example, information related to the vehicle 102 (i.e., make, model, color, maintenance history, etc.), and may also include insurance information associated with the vehicle (i.e., claims history, damage reports, etc.).

In this circumstance, the device 104 will obtain a wireless communication address at block 702, and will recognize that the address does not match any stored addresses at block 704, and has never been obtained before. Thus, prior to the insured driver taking the new vehicle 102 on a first vehicle trip (i.e., the first trip the insured driver has ever made in the new vehicle 102 while possessing the device 104), the device 104 will prompt the insured driver to confirm the insured driver wishes to add the detected new vehicle 102 to the insured driver's profile. Optional block 706 may be performed by, for example, any or all of the one or more processors 112 of the device 104, any or all of the one or more processors 120 of the server 106, or any combination of both.

If the insured driver confirms that they wish to add the new vehicle 102, at optional block 708, the device 104 will store the wireless communication address to enable subsequent identification of the vehicle 102 as one of one or more known vehicles associated with the insured driver. For example, the device 104 may store the wireless communication address and the corresponding identifying information of the vehicle 102 in the application described further herein. After the initial setup described in optional blocks 706 and 708, the device 104 may thereafter determine whether the wireless communication address of the vehicle 102 corresponds to one of the one or more known vehicles at block 704, and simply proceed to optional block 710. Optional block 708 may be performed by, for example, any or all of the one or more processors 112 of the device 104, any or all of the one or more processors 120 of the server 106, or any combination of both.

At optional block 710, the device 104 identifies the first movement of the vehicle 102 while a mobile application is in a background state. The device 104 may analyze data from the one or more sensors 118 to identify the first movement of the vehicle 102. For example, the one or more sensors 118 of the device 104 may transmit to the one or more processors 112 data indicating that the vehicle 102 has begun moving by sensing acceleration of the vehicle through an accelerometer. Similarly, the one or more sensors 118 may transmit to the one or more processors 112 data indicative of a change in position of the vehicle 102 from its normal resting position through a global positioning system (GPS) module. Thus, the device 104 is able to identify the beginning of a vehicle trip. Optional block 710 may be performed by, for example, any or all of the one or more processors 112 of the device 104, any or all of the one or more processors 120 of the server 106, or any combination of both.

The mobile application may be inactive or fully deactivated when the device 104 identifies the first movement of the vehicle 102. In certain embodiments, the mobile application may be one of multiple applications the device 104 uses to perform some and/or all of the steps associated with the method described herein. In these embodiments, the device 104 may prompt the user to download additional applications or other software updates. The mobile application may be associated with and/or provided by, for example, an insurance provider.

At optional block 712, the device 104 switches the mobile application to an activated state after the one or more processors 112 identify the first movement of the vehicle. For example, after the device 104 analyzes the data from the one or more sensors 118 to identify the first movement of the vehicle, the device 104 may then activate the application to begin tracking a vehicle trip. At this point, the application may begin receiving data directly from the one or more sensors 118 to use for vehicle trip analysis. Alternatively, the application may contact external or third party devices to receive data associated with the vehicle trip. Optional block 712 may be performed by, for example, any or all of the one or more processors 112 of the device 104, any or all of the one or more processors 120 of the server 106, or any combination of both.

Moreover, the device 104 may switch the application to an activated state at any point during or after the vehicle trip. To illustrate, in certain embodiments, the device 104 may record data associated with the vehicle trip locally (i.e., in memory 114). In these embodiments, the device 104 may activate the application after completing a vehicle trip, and provide the data to the application for subsequent vehicle trip analysis purposes, as described herein.

At block 714, in response to determining that the wireless communication address corresponds to one of the one or more known vehicles associated with the insured driver, the device 104 will collect a plurality of vehicle telematics data during the vehicle trip. The device 104 may collect the vehicle telematics data via, for example, any or all of the one or more processors 112 of the device 104 through communication with one or more sensors (e.g., sensor array 118). In certain embodiments, the one or more sensors includes at least one of (i) an accelerometer, (ii) a gyroscope, (iii) a magnetometer, (iv) a global positioning system (GPS), (v) a barometer, (vi) a proximity sensor, and (vii) an ambient light sensor. Optional block 714 may be performed by, for example, any or all of the one or more processors 112 of the device 104, any or all of the one or more processors 120 of the server 106, or any combination of both.

At optional block 716, the device 104 detects a second movement of the vehicle 102, wherein the second movement is indicative of an end of the vehicle trip. Optional block 716 may be performed by, for example, one or more processors (e.g., any or all of the one or more processors 112 of the device 104, any or all of the one or more processors 120 of the server 106, or any combination of both) through communication with one or more sensors (e.g., sensor array 118).

For example, the one or more processors may detect, through the one or more sensors 118 of the device 104, that the vehicle trip has ended by detecting a speed of 0 miles per hour (mph) for longer than a threshold time period (e.g., vehicle 102 travels at 0 mph for greater than 5 minutes). The one or more processors may further detect that the vehicle trip has ended by detecting the deceleration of the vehicle 102 through an accelerometer, and a subsequent lack of acceleration for longer than a threshold time period (e.g., no acceleration for greater than 5 minutes). Similarly, the one or more processors may detect no change in position of the vehicle 102 from its current resting position for longer than a threshold time period through a global positioning system (GPS) module, and conclude that the vehicle 102 has ended a vehicle trip (e.g., no change in position for greater than 5 minutes).

At optional block 718, the device 104 transmits the plurality of vehicle telematics data to a driving history server (e.g., server 106). Once transmitted, the driving history server 106 may store the plurality of vehicle telematics data in memory (e.g., memory 122). Specifically, the driving history server 106 may store the plurality of vehicle telematics data in the driving history database 126. Additionally or alternatively, the device 104 may record the plurality of vehicle telematics data in, for example, the memory (e.g., memory 114) of the device 104. Optional block 718 may be performed by, for example, any or all of the one or more processors 112 of the device 104, any or all of the one or more processors 120 of the server 106, or any combination of both.

At block 720, the one or more processors (e.g., processor 112 and/or processor 120) analyzes the plurality of telematics data to determine at least one driving behavior of the insured driver. The device 104 may determine the one or more driving behaviors by, for example, analyzing each of the plurality of vehicle telematics data recorded during the vehicle trip to perform a calculation resulting in the one or more driving behaviors. The at least one driving behavior may indicate, for example, the driver's performance at a particular moment during a vehicle trip (e.g., a harsh braking or cornering event), the driver's performance in a single area of interest (e.g., speeding, braking, acceleration, etc.) throughout a vehicle trip, or may be an aggregate representation of the driver's performance during a vehicle trip (e.g., trip total score 610 or trip average score 612). In certain embodiments, the plurality of vehicle telematics data includes at least one value indicative of each one of (i) speeding, (ii) acceleration, (iii) braking, (iv) cornering, and (v) mobile device 104 usage. Block 720 may be performed by, for example, any or all of the one or more processors 112 of the device 104, any or all of the one or more processors 120 of the server 106, or any combination of both. However, in certain embodiments, the one or more processors are contained in the mobile device 104.

The speeding value may be indicative of, for example, the average speed of the vehicle 102 during a vehicle trip, or the amount of time the vehicle 102 remained above the posted speed limit. In other embodiments, the speeding value may be indicative of the number of times the recorded speed of the vehicle 102 exceeded a threshold value (e.g., 80 mph). If the device 104 collects a speeding value exceeding the threshold value, the device 104 may identify that point in the vehicle trip as a speeding violation, which may impact the determination of the at least one driving behaviors, described herein.

The acceleration value may be indicative of, for example, the average acceleration of the vehicle 102 during a vehicle trip, or the number of times the vehicle accelerated faster than a threshold value (e.g., 3.5 meters per second squared). For example, if the device 104 collects an acceleration value exceeding the threshold value, the device 104 may identify that point in the vehicle trip as an acceleration violation, which may impact the determination of the at least one driving behaviors, described herein.

The braking value may be indicative of, for example, the total amount of braking applied during a vehicle trip, or the number of times an amount of deceleration below a threshold (e.g., −3.5 meters per second squared) was collected. For example, if the device 104 collects a braking value exceeding the threshold value, the device 104 may identify that point in the vehicle trip as a braking violation, which may impact the determination of the at least one driving behaviors, described herein.

The cornering value may indicate, for example, the average cornering speed of the vehicle 102 during the vehicle trip, or the number of times the vehicle 102 cornered at speeds above a threshold value. For example, if the device 104 collects a cornering value exceeding the threshold value, the device 104 may identify that point in the vehicle trip as a cornering violation, which may impact the determination of the at least one driving behaviors, described herein.

The mobile device 104 usage value may indicate, for example, the amount of time the driver was looking at a mobile device (e.g., mobile device 104) during a vehicle trip, the total number of times a driver was distracted by looking at the mobile device 104 during a vehicle trip, or the average length of time a driver was distracted while looking at the mobile device 104 during a vehicle trip. For example, the device 104 may collect a mobile device unlock event indicating the driver was distracted by the mobile device. Based on the amount of time spent until the next detected phone lock event, the device 104 may identify that point in the vehicle trip as a mobile device 104 usage violation, which may impact the determination of the at least one driving behaviors, described herein. The plurality of vehicle telematics data may include additional values indicative of other vehicle telematics (e.g., pitch, roll, yaw, jerk, etc.).

For example, the device 104 may perform this calculation by summing each of the plurality of vehicle telematics data, taking a weighted average of each of the plurality of vehicle telematics data, or any other suitable calculation process. Moreover, the device 104 may include all, some, or one of the plurality of vehicle telematics data when calculating the at least one driving behavior. To illustrate, the device 104 may weight each of the values indicating each one of (i) speeding, (ii) acceleration, (iii) braking, (iv) cornering, and (v) mobile device 104 usage by dividing, multiplying, or otherwise mathematically modifying the values with associated weights. The device 104 may then sum each of the weighted values and divide by the total number of weighted values to generate the at least one driving behavior. Regardless, it should be understood that the at least one driving behavior may be an alphanumeric character, symbol, or any other suitable indication.

At optional block 722, the device 104 obtains a driving history from the driving history server 106. Specifically, the device 104 may obtain the driving history from the driving history database 126 of the driving history server 106. The device 104 may use the driving history to, for example, generate displays which combine the at least one driving behavior with the driving history of an insured driver to create composite representations of an insured driver's progress across multiple vehicle trips. In other words, the device 104 may generate, for example, GUI elements such as the trip metric display 614, based on the obtained driving history. Optional block 722 may be performed by, for example, any or all of the one or more processors 112 of the device 104, any or all of the one or more processors 120 of the server 106, or any combination of both.

At block 724, the device 104 displays the at least one driving behavior and the driving history to an insured driver. The device 104 may display the at least one driving behavior and the driving history on an interface of the mobile device 104, or any other connected device. The device 104 may display the at least one driving behavior and the driving history during or after a vehicle trip has ended. The device 104 may also display the at least one driving behavior and the driving history at different times and/or on different display screens or displays. In certain embodiments, the device 104 displays the at least one driving behavior and the driving history to an insured driver during a vehicle trip, while updating the at least one driving behavior and the driving history in real-time. The device 104 may also, for example, display the at least one driving behavior and the driving history in accordance with the GUI embodiments discussed herein. Block 724 may be performed by, for example, any or all of the one or more processors 112 of the device 104, any or all of the one or more processors 120 of the server 106, or any combination of both.

At optional block 726, the device 104 updates an aspect of an insurance policy based on the at least one driving behavior. Updating the aspect of the insurance policy may include determining a cost, premium, deductible, discount, or coverage level associated with insurance coverage for the vehicle 102. For example, an at least one driving behavior indicating consistently safe driving habits may be used to reduce the premium for an insurance policy covering the vehicle 102 or to provide a discount on the insured driver's next premium payment for the insurance policy. Optional block 726 may be performed by, for example, any or all of the one or more processors 112 of the device 104, any or all of the one or more processors 120 of the server 106, or any combination of both.

As another example, the device 104 may determine coverage levels for a vehicle 102 based on the at least one driving behavior from a first vehicle trip, and then update the aspect (e.g., premium, deductible, coverage, etc.) of the insurance policy based on subsequent vehicle trips. Alternatively, the insurance policy may be a pre-existing policy associated with the vehicle 102 before any steps of the method 700 were performed. In some embodiments, updating the aspect of the insurance policy may include generating an indication of the update and causing such indication to be presented to a policyholder via a computer interface (e.g., interface of the device 104 or an integrated vehicle 102 interface). In further embodiments, the update is implemented by a server (e.g., server 106), which may include generating policy documents and obtaining payment.

By providing a system and method that allow analyzing a vehicle trip as described herein, various advantages are achieved. For example, the system and method provide and/or are implemented through the use of a device(s) that provide information particularly suited for use with other features of the system and method to analyze a vehicle trip. Notably, the system and method provide a seamless, single-device (e.g., device 104) solution to identifying a vehicle an insured driver is driving on a vehicle trip, collecting vehicle telematics data, and analyzing the vehicle telematics data to determine at least one driving behavior of an insured driver. Other advantages will be recognized by one of ordinary skill in the art in light of the teaching and disclosure herein.

As will be apparent from the above description, and as should be appreciated with respect to all examples presented herein, various ones of the functions or operations shown in FIG. 7 are optional. Furthermore, the functions or operations shown in FIG. 7 may be performed in any suitable order, any desired number of times, and/or with any suitable variation to the particular order and/or combination shown so as to achieve a desired result, such as a desired manner of analyzing a vehicle trip.

IV. ADDITIONAL CONSIDERATIONS

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the mobile device 104, the server 106, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the mobile device 104, the server 106, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for analyzing a vehicle trip. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in such claims. The systems and methods described herein are directed to an improvement to computer functionality, and improve the functioning of conventional computers.

What is claimed is:

1. A computer-implemented method, comprising:
receiving, by one or more processors of a mobile device, a list of wireless communication addresses, each wireless communication address uniquely identifying one or more vehicles covered by an insurance policy of a respective insured driver;
storing, by the one or more processors, the list in a memory operably connected to the one or more processors;
determining, by the one or more processors and upon the mobile device entering into a threshold communication range of a first vehicle, a first wireless communication address of the first vehicle, wherein the first wireless communication address is determined by the one or more processors without establishing a communication link between the mobile device and the first vehicle;
determining, by the one or more processors, that the first wireless communication address matches a second wireless communication address included in the list of wireless communication addresses stored in the memory;
causing, by the one or more processors and based on determining that the first wireless communication address matches the second wireless communications address, one or more sensors of the mobile device to capture sensor data;
identifying, by the one or more processors, based on the sensor data, a movement of the first vehicle indicative of a beginning of a vehicle trip of the first vehicle;
switching, by the one or more processors and based on identifying the movement, a mobile application operating on the mobile device from a background state to an active state, wherein, in the active state, the mobile application;
receives telematics data directly from
the one or more sensors of the mobile device during the vehicle trip, and
collects the telematics data in a memory associated with the mobile device
without maintaining a communication link with the first vehicle or a third-party telematics device; and
determining, by the one or more processors and based on the telematics data, a driving behavior of the insured driver.

2. The computer-implemented method of claim 1, wherein the first wireless communication address is a media access control (MAC) address corresponding to a Bluetooth device of the first vehicle.

3. The computer-implemented method of claim 1, further comprising:
obtaining, by the one or more processors and prior to the vehicle trip, a verification from the insured driver that the first vehicle is covered by the insurance policy of the insured driver; and responsive to receiving the verification from the insured driver, storing in the list, by the one or more processors, the first wireless communication address in association with the first vehicle.

4. The computer-implemented method of claim 1, wherein the one or more sensors includes at least one of (i) an accelerometer, (ii) a gyroscope, (iii) a magnetometer, (iv) a global positioning system (GPS), (v) a barometer, (vi) a proximity sensor, and (vii) an ambient light sensor, and wherein the telematics data includes at least one value indicative of each one of (i) speeding, (ii) acceleration, (iii) braking, (iv) cornering, and (v) mobile device usage.

5. The computer-implemented method of claim 1, further comprising identifying, by the one or more processors and based on the second telematics data, a vehicle state of the first vehicle indicative of an end of the vehicle trip.

6. The computer-implemented method of claim 1, further comprising:
transmitting, by the one or more processors, the telematics data to a driving history server;
obtaining, by the one or more processors, a driving history of the first vehicle from the driving history server; and
displaying, by the one or more processors, the driving behavior and the driving history to the insured driver.

7. The computer-implemented method of claim 1, further comprising:
updating, by the one or more processors, an aspect of the insurance policy based on the driving behavior of the insured driver, wherein the insurance policy is associated with the first vehicle, and wherein the aspect of the insurance policy includes at least one of a (i) cost, (ii) premium, (iii) deductible, (iv) discount, or (v) coverage level associated with the insurance policy.

8. A computer device for analyzing a vehicle trip, the computer device comprising:
one or more processors; and
one or more memories coupled to the one or more processors, the one or more memories including non-transitory computer executable instructions stored therein that, when executed by the one or more processors, cause the one or more processors to:
receive a list of wireless communication addresses, each wireless communication address uniquely identifying one or more insured vehicles covered by an insurance policy of a respective insured driver;
store the list in the one or more memories;
determine, upon entering into a threshold communication range of a vehicle, a first wireless communication address of the vehicle, wherein the first wireless communication address is determined by the one or more processors without establishing a communication link between the computer device and the vehicle;
determine that the first wireless communication address matches a second wireless communications address included in the list of wireless communication addresses stored in the one or more memories;
cause, based on determining that the first wireless communication address matches the second wireless communications address, one or more sensors of the computer device to capture sensor data;
identify, based on the sensor data, a movement of the vehicle indicative of a beginning of a vehicle trip of the vehicle;

switch, based on identifying the movement, an application operating on the computer device from a background state to an active state, wherein, in the active state, the application:
receives telematics data directly from the one or more sensors
of the computer device during the vehicle trip, and
collects the telematics data in a memory associated with the computer device without maintaining a communication link with
the vehicle or a third-party telematics device; and
determine, based on the telematics data, a driving behavior of the insured driver.

9. The computer device of claim 8, wherein the first wireless communication address is a media access control (MAC) address corresponding to a Bluetooth device of the vehicle, and wherein the non-transitory computer executable instructions, when executed on the one or more processors, further cause the one or more processors to:
obtain, prior to the vehicle trip, a verification from the insured driver that the MAC address corresponds to an insured vehicle covered by the insurance policy of the insured driver; and
store in the list, responsive to receiving the verification from the insured driver, the MAC address in association with the vehicle.

10. The computer device of claim 8, wherein the one or more sensors includes at least one of (i) an accelerometer, (ii) a gyroscope, (iii) a magnetometer, (iv) a global positioning system (GPS), (v) a barometer, (vi) a proximity sensor, and (vii) an ambient light sensor; and
wherein the telematics data includes at least one value indicative of (i) speeding, (ii) acceleration, (iii) braking, (iv) cornering, and (v) mobile device usage.

11. The computer device of claim 8, wherein the non-transitory computer executable instructions, when executed on the one or more processors, further cause the one or more processors to:
transmit the telematics data to a driving history server;
obtain a driving history from the driving history server; and
display the driving behavior and the driving history to the insured driver.

12. The computer device of claim 8, wherein the non-transitory computer executable instructions, when executed on the one or more processors, further cause the one or more processors to:
update an aspect of the insurance policy based on the driving behavior of the insured driver, wherein the aspect of the insurance policy includes at least one of a (i) cost, (ii) premium, (iii) deductible, (iv) discount, or (v) coverage level associated with the insurance policy.

13. A non-transitory computer readable storage medium comprising computer readable instructions stored thereon for analyzing a vehicle trip, wherein the instructions when executed on one or more processors cause the one or more processors to:
receive a list of wireless communication addresses, each wireless communication address uniquely identifying one or more insured vehicles covered by an insurance policy of a respective insured driver;
store the list in a memory operably connected to the one or more processors;
determine, upon a mobile device associated with the one or more processors entering into a threshold communication range of a vehicle, a first wireless communication address of the vehicle, wherein the first wireless communication address is determined by the one or more processors without establishing a communication link between the mobile device and the vehicle;

determine that the first wireless communication address matches a second wireless communications address included in the list of wireless communication addresses stored in the memory;

cause, based on determining that the first wireless communication address matches the second wireless communications address, one or more sensors of the mobile device to capture sensor data;

identify, based on the sensor data, a movement of the vehicle indicative of a beginning of a vehicle trip of the vehicle;

switch, based on identifying the movement, a mobile application operating on the mobile device from a background state to an active state, wherein, in the active state, the mobile application:

receives telematics data directly from the one or more sensors, of the mobile device during the vehicle trip, and collects the telematics data in a memory associated with the mobile device without maintaining a communication link with the vehicle or a third-party telematics device; and determine, based on the telematics data, a driving behavior of the insured driver.

14. The non-transitory computer readable storage medium of claim 13, wherein the first wireless communication address is a media access control (MAC) address corresponding to a Bluetooth device of the vehicle, and wherein the instructions, when executed on the one or more processors, further cause the one or more processors to:

obtain, prior to the vehicle trip, a verification from the insured driver that the MAC address corresponds to an insured vehicle covered by the insurance policy of the insured driver; and store in the list, responsive to receiving the verification from the insured driver, the MAC address in association with the vehicle.

15. The non-transitory computer readable storage medium of claim 13, wherein the one or more sensors includes at least one of (i) an accelerometer, (ii) a gyroscope, (iii) a magnetometer, (iv) a global positioning system (GPS), (v) a barometer, (vi) a proximity sensor, and (vii) an ambient light sensor, and wherein the telematics data includes at least one value indicative of each one of (i) speeding, (ii) acceleration, (iii) braking, (iv) cornering, and (v) mobile device usage.

16. The non-transitory computer readable storage medium of claim 13, wherein the instructions, when executed on the one or more processors, further cause the one or more processors to:

update an aspect of the insurance policy based on the driving behavior of the insured driver, wherein the aspect of the insurance policy includes at least one of a (i) cost, (ii) premium, (iii) deductible, (iv) discount, or (v) coverage level associated with the insurance policy.

17. The computer device of claim 8, wherein:

the computer device is a mobile device separate from the vehicle, and the first wireless communication address is a media access control (MAC) address corresponding to a Bluetooth device of the vehicle.

18. The computer-implemented method of claim 1, wherein collecting the telematics data further comprises:

identifying, by the one or more processors, an end of the vehicle trip, based on the telematics data indicating one or more of:

a speed of zero for longer than a first threshold period of time, a deceleration immediately followed by a lack of acceleration for longer than a second threshold period of time, or no change in position for longer than a third threshold period of time; and switching, by the one or more processors, and based on identifying the end of the vehicle trip, the mobile application from the active state to the background state.

19. The computer-implemented method of claim 18, further comprising:

transmitting, by the one or more processors, and based on identifying the end of the vehicle trip, the telematics data to a driving history server.

20. The computer device of claim 17, wherein the non-transitory computer executable instructions, when executed on the one or more processors, further cause the one or more processors to:

identify, based on the telematics data, an end of the vehicle trip; and switch, based on identifying the end of the vehicle trip, the application from the active state to the background state; and transmit, based on identifying the end of the vehicle trip, the telematics data to a driving history server.

* * * * *